(12) United States Patent
Jain et al.

(10) Patent No.: US 9,098,622 B2
(45) Date of Patent: Aug. 4, 2015

(54) SYSTEM AND METHOD FOR AUTOMATED AND OBJECTIVE ASSESSMENT OF PROGRAMMING LANGUAGE CODE

(75) Inventors: Kshitiz Jain, Jaipur (IN); Meenakshi Sahasranaman, Trivandrum (IN); Lakshmi Davangere Lakshmana Setty, Mysore (IN); Sundaresan Krishnan Iyer, Chennai (IN); Subraya Beleyur Manjappa, Karnataka (IN)

(73) Assignee: Infosys Limited, Bangalore (IN)

( * ) Notice: Subject to any disclaimer, the term of this patent is extended or adjusted under 35 U.S.C. 154(b) by 168 days.

(21) Appl. No.: 13/527,423

(22) Filed: Jun. 19, 2012

(65) Prior Publication Data
US 2013/0219374 A1    Aug. 22, 2013

(30) Foreign Application Priority Data
Feb. 17, 2012    (IN) .............................. 590/CHE/2012

(51) Int. Cl.
*G06F 9/44*     (2006.01)
*G06F 11/36*    (2006.01)

(52) U.S. Cl.
CPC .............. *G06F 11/3612* (2013.01); *G06F 8/30* (2013.01); *G06F 11/3684* (2013.01)

(58) Field of Classification Search
CPC .... G06F 8/30; G06F 11/3684; G06F 11/3612
USPC ......................................................... 717/131
See application file for complete search history.

(56) References Cited

U.S. PATENT DOCUMENTS

| | | | |
|---|---|---|---|
| 6,006,028 A * | 12/1999 | Aharon et al. ................... 703/21 |
| 6,434,738 B1 * | 8/2002 | Arnow .......................... 717/106 |
| 7,184,978 B1 | 2/2007 | Tams et al. |
| 7,389,916 B2 | 6/2008 | Chirnomas |
| 7,735,068 B2 * | 6/2010 | Siddaramappa et al. ...... 717/128 |
| 8,423,986 B1 * | 4/2013 | Grechanik ..................... 717/154 |
| 2003/0056192 A1 | 3/2003 | Burgess |
| 2005/0187833 A1 | 8/2005 | Royer et al. |
| 2007/0234314 A1 * | 10/2007 | Godwin et al. ............... 717/136 |
| 2008/0189145 A1 | 8/2008 | Wurster |
| 2010/0180256 A1 * | 7/2010 | Gorthi et al. .................. 717/124 |
| 2010/0281460 A1 * | 11/2010 | Tillmann et al. .............. 717/106 |

(Continued)

OTHER PUBLICATIONS

Higgins et al, Automated Assessment and Experiences of Teaching Programming (2005) Applicant Provided Prior Art.*

(Continued)

*Primary Examiner* — Don Wong
*Assistant Examiner* — Theodore Hebert
(74) *Attorney, Agent, or Firm* — LeClairRyan, a Professional Corporation

(57) ABSTRACT

A system and method of evaluating a software program is disclosed. Information of a proposed problem is received from a user via the user interface and a problem profile associated with the proposed problem is created. A master software solution associated with the proposed problem is processed to identify one or more attributes, such as a first identified attribute. One or more first test cases associated with the first identified attribute in the master software solution are generated. An evaluation program including at least the one or more generated first test cases is generated. The generated evaluation program is configured to be applied to at least one submitted software program that is to be evaluated. At least the one or more first test cases is configured to be applied as one or more test inputs to a corresponding attributes in the submitted software program.

27 Claims, 6 Drawing Sheets

(56) References Cited

U.S. PATENT DOCUMENTS

| | | | |
|---|---|---|---|
| 2011/0016451 A1* | 1/2011 | Gorthi et al. | 717/124 |
| 2012/0023485 A1* | 1/2012 | Dubey et al. | 717/125 |
| 2013/0219374 A1* | 8/2013 | Jain et al. | 717/131 |

OTHER PUBLICATIONS

Ellsworth et al., JUnit + Jtest = Automated Test Case Design and Static Analysis: p. 2, Devx.com (May 9, 2003) retrieved from http://www.devx.com/Java/Article/15625/0/page/2 on Sep. 15, 2014.*

Comparison, 4.1 Writing a Test Case: Quick Start, myspl.com (2006) retrieved from http://web.archive.org/web/20120523212138/http://dev.mysql.com/doc/mysqltest/1.0/en/writing-tests-quick-start.html on Sep. 15, 2014.*

Helmick et al, Interface based programming assignments and automatic grading of java programs (2007) Applicant Provided Prior Art.*

"AssetGather for Rental & Leasing," Copyright(c) AssetPulse, LLC, 2006-2012, http://www.assetpulse.com/rental.leasing.html.

Fully Automatic Assessment of Programming Exercises; Riku Saikkonen, Lauri Malmi, and Ari Korhonen, Department of Computer Science and Engineering; Helsinki University of Technology, Finland, 2001.

Interface-based Programming Assignments and Automatic Grading of Java Programs, Michael T. Helmick, Miami University Department of Computer Science and Systems Analysis, Oxford, Ohio USA, 2007.

Automated Assessment and Experiences of Teaching Programming, Colin A. Higgins, Geoffrey Gray, Pavlos Symeonidis, Athanasios Tsintsifas, The University of Nottingham, Nottingham,UK, 2005.

* cited by examiner

Static Test Case Marks

| | | | |
|---|---|---|---|
| Abstract Class | 0.25 | Interface Member | 0.25 |
| Constructor Prototype | 0.25 | Interface Member Count | 0.25 |
| Members with Modifiers | 0.25 | Interface Method Count | 0.25 |
| Methods with Modifiers | 0.25 | Getter/Setter Declaration | 0.1 |
| Superclass | 0.25 | Getter/Setter Definition | 0.15 |
| Method Invocations | 0.25 | Constructor Initialization | 0.25 |
| Object Creation | 0.5 | Autogeneration | 0.75 |
| Interface Implement | 0.25 | Others * | 0.5 |

[Save]   [Reset]

*FIG. 5*

\* Test cases that check the declaration of members and methods with no modifiers and the count of members and methods and in a class

Dynamic Test Marks

Paper ID [ 1 ]   Total Names [ 20.0 ]

class KnowledgeAsset

| | |
|---|---|
| Static Check | [1.8] |
| Setters & Getters | [0.45] |
| Constructor Initialization | [1.0] |
| | |
| Class Total | [3.25] | class BOK

| | |
|---|---|
| Static Check | [1.4] |
| Setters & Getters | [0.6] |
| Constructor Initialization | [0.25] |
| calculateKCU | [4.25] |
| validateAudienceType | [1.0] |
| validateCategory | [1.5] |
| Class Total | [9.0] | class Tutorial

| | |
|---|---|
| Static Check | [1.3] |
| Setters & Getters | [0.45] |
| Constructor Initialization | [0.25] |
| calculateKCU | [4.25] |
| validateContentQuality | [1.5] |
| Class Total | [7.75] | class Tutorial

| | |
|---|---|
| Marks | [0.0] |
| Class Total | [0.0] |

GRAND TOTAL [ 20.0 ]   [Check Total]   [Edit]   [Enter Marks]

*FIG. 6*

SYSTEM AND METHOD FOR AUTOMATED AND OBJECTIVE ASSESSMENT OF PROGRAMMING LANGUAGE CODE

RELATED APPLICATION

The present application claims the benefit of priority under 35 U.S.C. 119 on Indian Patent Application Serial No. 590/CHE/2012, filed Feb. 17, 2012, and entitled "System and Method For Automated And Objective Assessment Of Programming Language Code", all commonly owned herewith.

FIELD

The present disclosure relates to a system and method for automated and objective assessment of programming language code.

BACKGROUND

Many academic institutions have courses which teach software programming to students. It is common in these courses for students to learn the programming language in a hands-on environment by allowing the student to develop his/her own software programs for question papers assigned by the instructor. Each student's knowledge of the programming language is then evaluated by the instructor reviewing the student's written code and/or actually running the student's program on a computer. This would require the instructor to run the program, input information in response to several inquiries generated by the student's program, review all of the program's outputs before scoring the student's response. Requiring the instructor to manually evaluate each student's submission program (in a potential class of a hundred students) is burdensome and time consuming. Further, it may be possible that the instructor may input two different values for the same inquiry when running two different students' programs. This results in a non-objective evaluation of different students' program and produces inconsistencies in scoring among the students' submissions.

What is needed is a solution which automatically evaluates a plurality of student submitted software programs in an objective and efficient manner to address the above specified disadvantages.

SUMMARY

In an aspect, a method of evaluating a software program is disclosed. The method comprises receiving information of a proposed problem from a user via the user interface and creating a problem profile associated with the proposed problem. The method comprises processing a master software solution associated with the proposed problem to identify one or more attributes, wherein the one or more identified attributes includes at least a first identified attribute. The method comprises generating one or more first test cases associated with the first identified attribute in the master software solution. The method comprises generating an evaluation program including at least the one or more generated first test cases, wherein the generated evaluation program is configured to be applied to at least one submitted software program to be evaluated. At least the one or more first test cases is configured to be applied as one or more test inputs to a corresponding attributes in the submitted software program.

In an aspect, a non-transitory computer readable medium having stored thereon instructions for evaluating a software program is disclosed. The medium containing machine executable code which when executed by at least one processor causes the processor to receive information of a proposed problem from a user via the user interface and create a problem profile associated with the proposed problem. The processor is further configured to process a master software solution associated with the proposed problem to identify one or more attributes, wherein the one or more identified attributes includes at least a first identified attribute. The processor is further configured to generate one or more first test cases associated with the first identified attribute in the master software solution. The processor is further configured to generate an evaluation program including at least the one or more generated first test cases. The generated evaluation program is configured to be applied to at least one submitted software program to be evaluated such that at least the one or more first test cases is configured to be applied as one or more test inputs to a corresponding attributes in the submitted software program.

In an aspect, a network device comprises a network interface that is capable of receiving and transmitting data packets over one or more networks. The network device comprises a memory that is configured to store one or more programming instructions that evaluate a software program. The network device comprises a processor that is configured to execute the stored programming instructions in the memory. When executing the instructions, the processor is configured to receive information of a proposed problem from a user via the user interface and create a problem profile associated with the proposed problem. The processor is further configured to process a master software solution associated with the proposed problem to identify one or more attributes, wherein the one or more identified attributes includes at least a first identified attribute. The processor is further configured to generate one or more first test cases associated with the first identified attribute in the master software solution. The processor is further configured to generate an evaluation program including at least the one or more generated first test cases, wherein the generated evaluation program is configured to be applied to at least one submitted software program to be evaluated such that at least the one or more first test cases is configured to be applied as one or more test inputs to a corresponding attributes in the submitted software program.

In one or more of the above aspects, a second attribute from the master software solution is identified during processing. One or more second test cases associated with the second identified attribute from the master software solution are generated, wherein the second attribute and the one or more second test cases are included in the evaluation program.

In one or more of the above aspects, 15a first submitted software program is received, wherein the first submitted software program is associated with the proposed problem. The first submitted software program is executed. The one or more first test cases of the evaluation program are applied to the executed first submitted software program. In one or more of the above aspects, the first submitted software program is executed. The one or more second test cases of the evaluation program are applied to the executed first submitted software program.

In one or more of the above aspects, the evaluation program is converted into a programming language that is compatible with a programming language of the first and second submitted software programs.

In one or more of the above aspects, the one or more identified attributes are displayed on the user interface. A score value for at least the first identified attribute is received from the user via the user interface. A scoring profile is generated for the proposed problem, wherein the scoring profile includes the received score value for at least the first identified attribute.

In one or more of the above aspects, the first test case from the evaluation program is applied to a corresponding inquiry that is associated with the first attribute from the first submitted software program. An output from the first submitted software program for the first attribute is compared with a corresponding master output from the master software solution for the first attribute. It is determined whether the output from the first submitted software program matches the corresponding master output for the first attribute. A score for the first attribute is applied to the first submitted software program in accordance with a scoring profile if the output at least substantially matches the corresponding master output for the first attribute.

In one or more of the above aspects, the second test case from the evaluation program is applied to a corresponding inquiry associated with second first attribute from the first submitted software program. An output from the first submitted software program for the second attribute is compared with a corresponding master output from the master software solution for the second attribute. It is determined whether the output from the first submitted software program matches the corresponding master output for the second attribute. A score for the second attribute is applied to the second first submitted software program in accordance with the scoring profile.

In one or more of the above aspects, a second submitted software program is received, wherein the second submitted software program is associated with the proposed problem. The second submitted software program is executed and the evaluation program is applied to the executed second submitted software program. A score is applied to the second submitted software program in accordance with the scoring profile.

In one or more of the above aspects, the first and/or second attribute is a logic based attribute or a static based attribute.

In one or more of the above aspects, a parsing and/or reflection technique is performed on the master software solution and the submitted software program to identify the one or more attributes.

BRIEF DESCRIPTION OF THE DRAWINGS

FIGS. 5 and 6 illustrate examples of user interface displays representing various scoring features of the evaluation tool in accordance with an aspect of the present disclosure.

DETAILED DESCRIPTION

In general, the present disclosure is directed to an evaluation tool that is preferably utilized in an educational environment. The evaluation tool receives information regarding a proposed problem via a user interface along with a master solution software program for the proposed problem. The evaluation tool is configured to process the master solution program and automatically identify one or more attributes to test from the master solution program. The evaluation tool generates an evaluation program which includes generated test cases for each of the one or more identified attributes.

The evaluation tool is then able to apply the generated test cases in the generated evaluation program to software program responses provided by students in relation to the proposed problem. In particular, the evaluation tool applies the generated test cases, for each identified attribute, to the student's response and analyzes the output of the student's program. The evaluation tool compares the output of the student's program with an already established satisfactory outcome, provided by the administrator, to determine whether the student's program satisfies the expected outcome for that attribute. The evaluation tool applies a score to each identified attribute in accordance with an established scoring profile and calculates an overall score for the student's submission. The evaluation tool can generate a report which provides an overall score and/or individualized broken down scores of the student's submission.

The present system and method has several advantages. In an aspect, the present system and method is scalable in that it is configured to evaluate and score a plurality of student submissions. The present system and method is able to gauge the effectiveness of learning by testing multiple students' practical understanding of a programming language without manually testing each student's submission.

Figure 1:
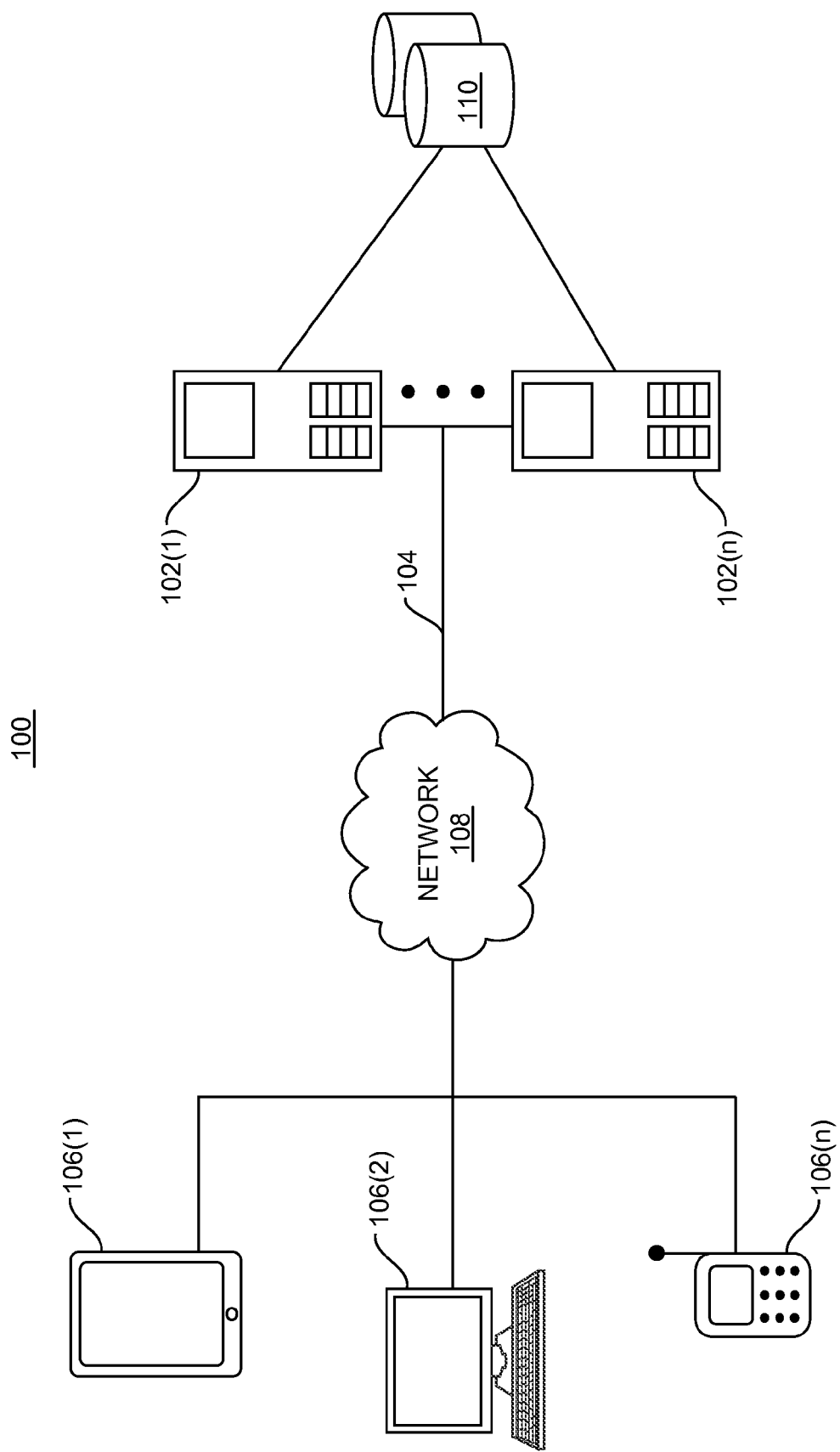
FIG. 1 illustrates a diagram of an example system environment that utilizes an evaluation tool in accordance with an aspect of the present disclosure.

FIG. 1 illustrates a diagram of an example system environment that implements and executes an automated software evaluation tool and associated method in accordance with an aspect of the present disclosure. In particular, the example system environment 100 includes a plurality of network devices such as one or more servers 102(1)-102(n) and one or more client devices 106(1)-106(n), although the environment 100 could include other numbers and types of devices in other arrangements. It should be noted that the term "network devices" can be referred to as encompassing one or more client devices, one or more servers, virtual machines, cloud computing devices and/or other components in the system 100.

The servers 102(1)-102(n) are connected to a local area network (LAN) 104 and the client devices 106(1)-106(n) are connected to a wide area network 108, whereby the one or more client devices 106(1)-106(n) communicate with the one or more servers 102(1)-102(n) via the wide area network 108 and LAN 104. The servers 102(1)-102(n) comprise one or more network devices or machines capable of operating one or more Web-based and/or non Web-based applications that may be accessed by other network devices (e.g. client devices, other servers) in the network 108. One or more servers may be front end Web servers, application servers, and/or database servers. Such data includes, but is not limited to Web page(s), image(s) of physical objects, user account information, and any other objects and information. It should be noted that the servers 102(1)-102(n) may perform other tasks and provide other types of resources.

One or more servers 102 may comprise a cluster of a plurality of servers which are managed by a network traffic management device (e.g. firewall, load balancer, web accelerator), gateway device, router, hub and the like. In an aspect, one or more servers 102(1)-102(n) may implement a version of Microsoft® IIS servers, RADIUS servers and/or Apache® servers, although other types of servers may be used and other types of applications may be available the on servers 102(1)-102(n). It should be noted that although the client device and/or server may be referred to herein in the plural, it is contemplated that only one client device and/or one server may be considered without being limiting to the language used herein. It should be understood that the particular configuration of the system 100 shown in FIG. 1 are provided for exemplary purposes only and is thus not limiting.

Client devices 106(1)-106(n) comprise computing devices capable of connecting to other computing devices, such as the servers 102(1)-102(n). Such connections are performed over wired and/or wireless networks, such as network 108, to send and receive data, such as for Web-based and non Web-based requests, receiving responses to requests and/or performing other tasks, in accordance with the novel processes described herein. Non-limiting and non-exhausting examples of such client devices 106(1)-106(n) include, but are not limited to, personal computers (e.g., desktops, laptops), mobile and/or smart phones, kiosks, tablet devices, PDAs and the like.

In an example, client devices 106(1)-106(n) may be configured to run a Web browser or other software module that provides a user interface for human users to interact with and access an evaluation tool 210. In an example, the user can use the client device 106 to request resources and/or information, as well as submit instructions over the network 108 to the one or more servers 102(1)-102(n) via Web-based or non Web-based applications. One or more Web-based or non Web-based applications may accordingly run on the servers 102(1)-102(n) that provide the requested data to the client device 106(1)-106(n) and/or perform the requested instructions on behalf of the user. In an example, the client device 106 may be a smart phone, tablet, or smart television in which the client devices 106(1)-106(n) communicate with the servers 102(1)-102(n) via a software application.

Network 108 comprises a publicly accessible network, such as the Internet, which handles communication between the client devices 106(1)-106(n) and the servers 102(1)-102(n). However, it is contemplated that the network 108 may comprise other types of private and public networks. Communications, such as requests from client devices 106(1)-106(n) and responses from servers 102(1)-102(n), preferably take place over the network 108 according to standard network protocols, such as the HTTP, UDP, and TCP/IP protocols and the like.

Further, it should be appreciated that the network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs, WANs and other networks to enable messages and other data to be sent and received between network devices. Also, communication links within and between LANs and other networks typically include twisted wire pair (e.g., Ethernet), coaxial cable, analog telephone lines, mobile cell towers, full or fractional dedicated digital lines including T1, T2, T3, and T4, Integrated Services Digital Networks (ISDNs), Digital Subscriber Lines (DSLs), wireless links including satellite links and other communications technologies.

LAN 104 may comprise one or more private and public networks which provide secured access to the servers 102(1)-102(n). These types of existing standardized messaging schemes used between financial institutions over WANs and LANs is well known and is not described in detail herein.

Figure 2:
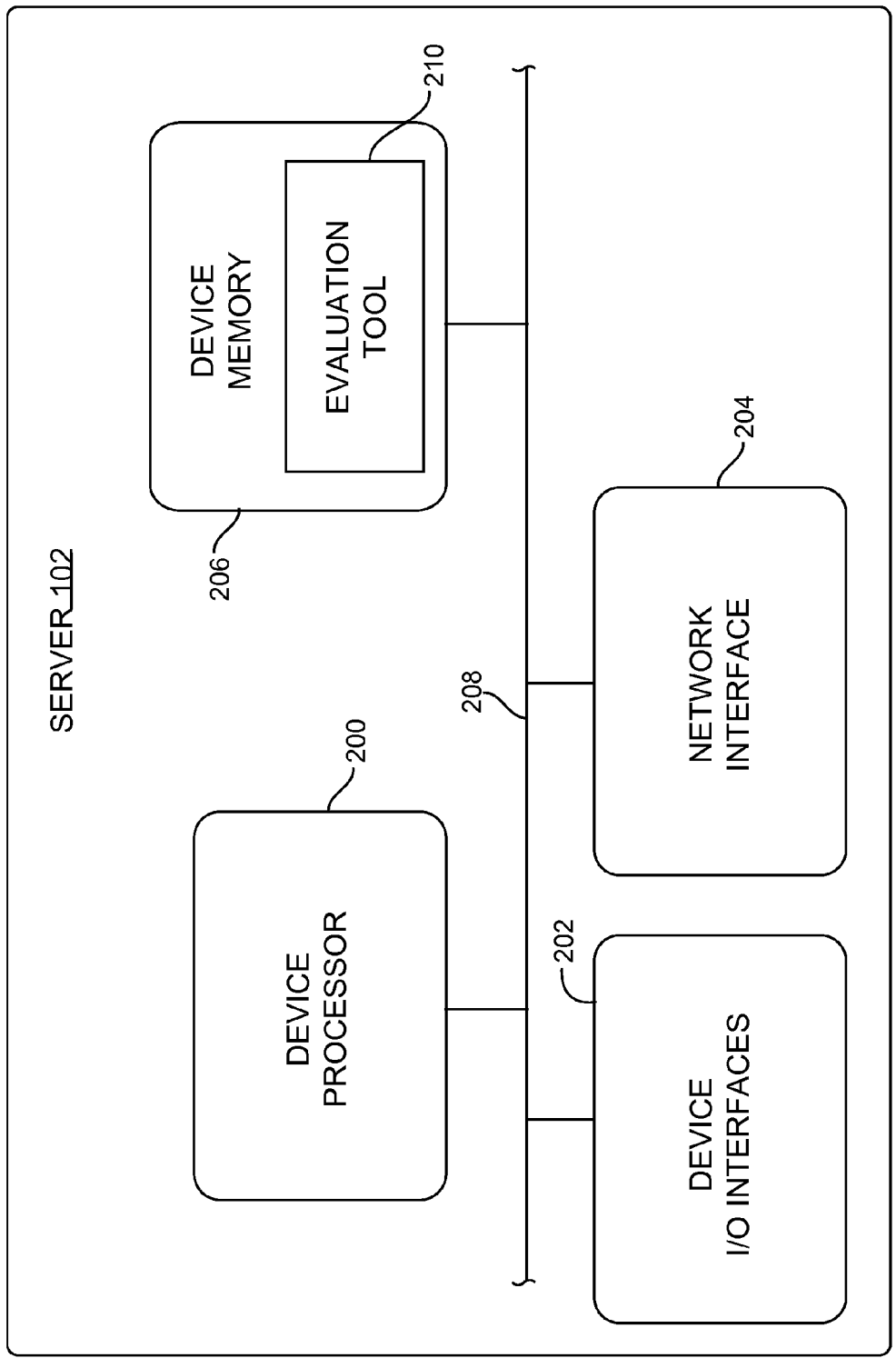
FIG. 2 illustrates a block diagram of a network device implementing the evaluation tool in accordance with an aspect of the present disclosure.

FIG. 2 illustrates a block diagram of a network device shown in FIG. 1 in accordance with an aspect of the present disclosure. The network device is described herein as being one or more server devices 102, although it should be noted that the network device may alternatively be one or more client devices 106. The network device 102 includes one or more device processors 200, one or more device I/O interfaces 202, one or more network interfaces 204 and one or more device memories 206, all of which are coupled together by one or more buses 208. As will be discussed in more detail below, the network device 102 includes an evaluation tool 210 stored in the memory 206 of the device 102 or in memories of more than one server device 102, such as in a cloud computing environment. It should be noted that the network device 102 could include other types and numbers of components.

Device processor 200 comprises one or more microprocessors configured to execute computer/machine readable and executable instructions stored in the respective local device memory 206 or in a remote device memory (not shown). Such instructions are implemented by the processor 200 to perform one or more functions described below. It is understood that the processor 200 may comprise other types and/or combinations of processors, such as digital signal processors, microcontrollers, application specific integrated circuits ("ASICs"), programmable logic devices ("PLDs"), field programmable logic devices ("FPLDs"), field programmable gate arrays ("FPGAs"), and the like. The processor 200 is programmed or configured to execute the process in accordance with the teachings as described and illustrated herein of the novel system and method described.

Device I/O interfaces 202 comprise one or more user input and output device interface mechanisms. The interface may include a computer keyboard, touchpad, touchscreen, mouse, display device, and the corresponding physical ports and underlying supporting hardware and software to enable communications with other network devices in the system 100. Such communications include, but are not limited to, accepting user data input and providing output information to a user, programming, accessing one or more memory devices and administering one or more functions to be executed by the corresponding device and the like.

Network interface 204 comprises one or more mechanisms that enable the client devices 106 and/or the servers 102 to engage in TCP/IP or other communications over the LAN 104 and network 108. However, it is contemplated that the network interface 204 may be constructed for use with other communication protocols and types of networks. Network interface 204 is sometimes referred to as a transceiver, transceiving device, or network interface card (NIC), which transmits and receives network data packets over one or more networks, such as LAN 104 and network 108.

In an example where the network device includes more than one device processor 200 (or a processor 200 has more than one core), each processor 200 (and/or core) may use the same single network interface 204 or a plurality of network interfaces 204 to communicate with other network devices. Further, the network interface 204 may include one or more physical ports, such as Ethernet ports, to couple its respective device with other network devices in the system 100. Moreover, the network interface 204 may include certain physical ports dedicated to receiving and/or transmitting certain types of network data, such as device management related data for configuring the respective device, and the like.

Bus 208 may comprise one or more internal device component communication buses, links, bridges and supporting components, such as bus controllers and/or arbiters. The bus 208 enables the various components of the device 102, such as the processor 200, device I/O interfaces 202, network interface 204, and device memory 206 to communicate with one another. However, it is contemplated that the bus 208 may enable one or more components of its respective network device to communicate with components in other devices as well. Example buses 208 include HyperTransport, PCI, PCI Express, InfiniBand, USB, Firewire, Serial ATA (SATA), SCSI, IDE and AGP buses. However, it is contemplated that other types and numbers of buses 208 may be used, whereby the particular types and arrangement of buses 208 will depend on the particular configuration of the network device 102 which houses the bus 208.

Device memory 206 comprises non-transitory computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media stores computer readable/machine-executable instructions, data structures, program modules and components, or other data, which may be obtained and/or executed by one or more processors, such as device processor 200. Such stored instructions allow the processor to perform actions, including implementing an operating system for controlling the general operation of the network device 102, and in particular the evaluation tool 210, to perform one or more portions of the novel processes described below.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Such desired information includes data and/or computer/machine-executable instructions and which can be accessed by the network device 102.

In general, the present system and method is directed to an automated software code evaluation tool 210. Overall, the evaluation tool 210 is configured to allow a user, via a user interface, to provide information of a proposed problem to be tested. The evaluation tool 210 is also configured to allow the user to provide a software-based master solution that is associated with the proposed problem. The evaluation tool 210 processes the master solution to automatically identify one or more static and logical attributes to test for subsequently provided student responses. The evaluation tool 210 is also configured to display the one or more identified attributes on the user interface and allows the user to provide scoring information for one or more of the identified attributes. Scoring information provided by the user is then stored as a scoring profile by the evaluation tool 210. The evaluation tool 210 is configured to generate one or more test cases for each identified attribute, whereby the generated test case(s) are embodied in an evaluation program that is generated and stored by the evaluation tool.

The evaluation program 210 may be configured to independently (on in conjunction with another solution) to run one or more student submitted software programs for a particular proposed problem. In particular, the test cases of the evaluation program are used as inputs to inquiries from the student's program. The evaluation tool 210 is configured to evaluate the output produced by the student's program per attribute(s), whereby the evaluation tool 210 applies a score in accordance with the scoring profile for the tested attribute(s).

Figure 3:
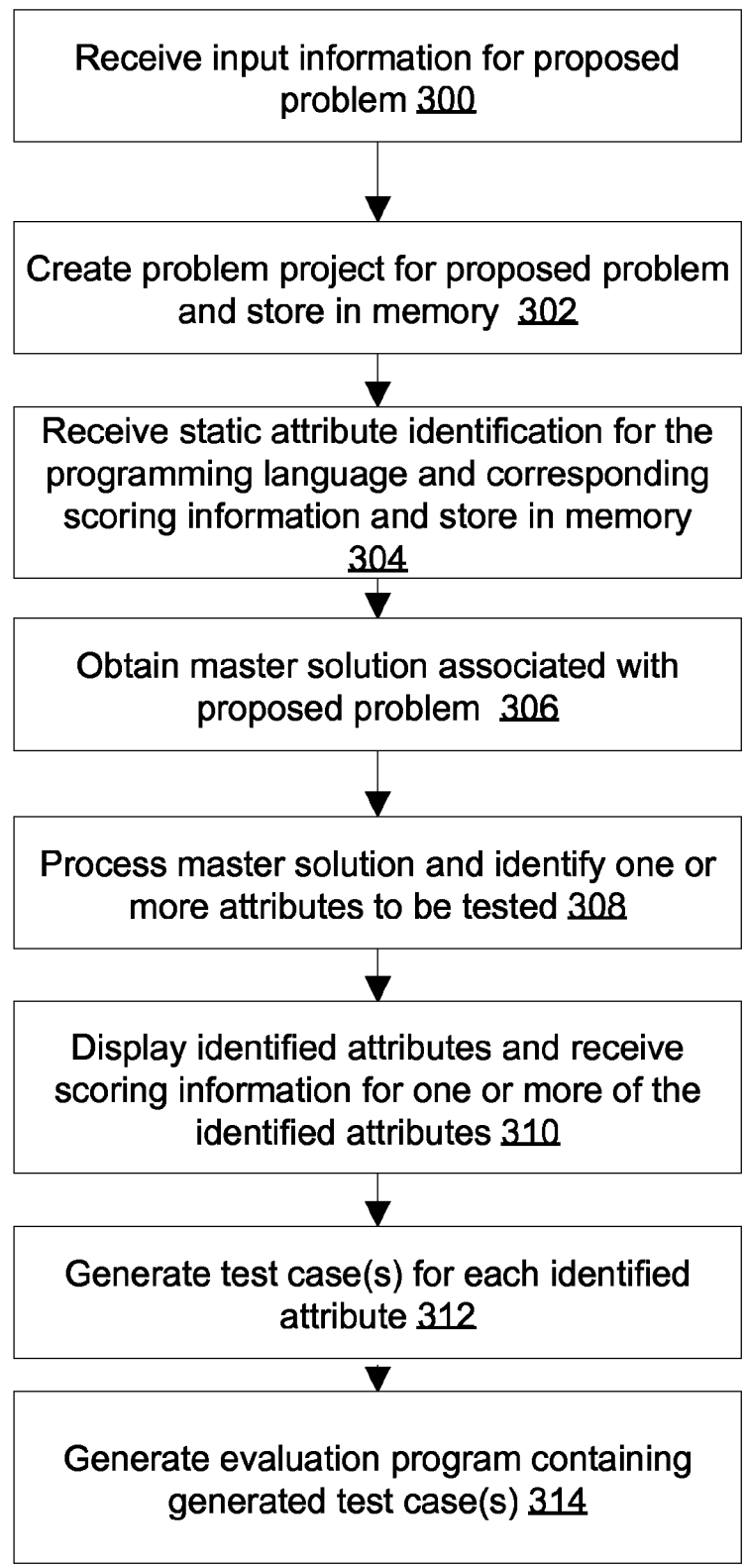
FIG. 3 illustrates an example flow chart diagram depicting at least a portion of processes performed by the evaluation tool in accordance with an aspect of the present disclosure.

FIG. 3 illustrates a flow chart describing the process for setting up a problem project, analyzing a master solution for a proposed problem and generating an evaluation program for the proposed problem in accordance with an aspect of the present disclosure. In particular, as shown in FIG. 3, the process begins where input information, associated with one or more proposed question problems, is provided to the evaluation tool 210 by the user via a user interface (Block 300).

The input information is preferably provided by the instructor, professor, teaching authority or the like ("user"), although other individuals who have authorized access to the evaluation tool 210 are considered users and thus may provide the input information. Such input information received by the evaluation tool 210 may include the title of the proposed problem, information regarding the proposed problem, the name and department of the instructor, information of the students who are to submit software code responses to the proposed problem, static based attribute and/or logical based attribute information as well as associated scoring information and the like.

The input information may be manually entered into the user interface and/or uploaded as one or more text files using a file upload feature provided in the user interface. The evaluation tool 210 thereafter creates a problem project for the proposed problem and stores the input information for the problem project in memory (Block 302).

In an aspect, the evaluation tool 210 is configured to allow the user, via the user interface, to identify one or more static attributes and provide scoring information for identified attributes for the proposed problem (Block 304).

In an aspect, the attribute(s) identified and designated by the user are static in nature and are associated with the particular proposed problem and/or programming language of the problem. For example, in a scenario where the programming language of the master solution is Java, the user may identify such attributes which is desired to be scored including, but not limited to, Abstract Class, Constructor Prototype, Interface Member and the like (see FIG. 5). Additionally, the evaluation tool 210 will provide input fields next to each identified attribute, whereby the user may input a desired score value for the attributes to be tested. Once the user has designated the desired scores and/or percentage points for the desired attributes, the evaluation tool 210 saves the score information as a score profile for the problem project. As will be discussed below, the evaluation tool 210 utilizes the score profile information to accordingly perform scoring operations on the student's submission for each designated attribute, whereby the evaluation tool 210 apportions the established scores among each of the number of test cases generated for the scores. Additionally or alternatively, it is contemplated, as discussed below, that the evaluation tool 210, when processing the master solution, may automatically identify the static attribute(s) to be tested directly from the master solution, whereby the evaluation tool 210 may display the identified attribute(s) on the user interface along with input fields next to each identified attribute. The evaluation tool 210 allows the user to provide scoring information for the automatically identified static attributes and saves those input scores to the scoring profile for the problem project.

In an aspect, the evaluation tool 210 is configured to receive or obtain a software code-based master solution associated with the proposed problem (Block 306). The programming language of the master solution is the same language as the students' submitted software programs. In an aspect, the master solution is written in an object oriented programming language such as, but not limited to, Java, C++, C#, VB.NET, Python and the like. It is contemplated, however, that the evaluation tool 210 may be utilized with other programming languages which are not object oriented based.

In an aspect, the obtained master solution is an executable software based program file that is uploadable to the evaluation tool 210 from one or more databases, a cloud environment, a local hard drive, a pen drive, a client device 106, a server 102, a mobile device, a network and the like. In an aspect, the master solution is uploaded to the evaluation tool 210 using the user interface, whereby the master solution is stored in the memory and is associated with the problem project for the proposed problem.

In processing the master solution, the evaluation tool 210 identifies one or more static and/or logical attributes that are to be eventually tested (Block 308). In particular to an aspect involving an object oriented master solution, the evaluation tool 210 utilizes at least parsing and/or reflection methods to check for and identify static and/or logical attributes contained in the master solution.

Syntactical or static based attributes may include, but are not limited to, class checking, function names, variables and the like that are typically required to be coded to provide the solution for a given problem. Generally, logical attributes may involve checking for expected outcomes for a given set of inputs per method/function written. Such syntactical and/or logical attributes can include, but are not limited to: the number, names, and specifications (e.g. public, abstract) for each class; names, data types and other specifications for data members of each class; names, data types and other specifications for member methods of each class; accepted outputs from each method for given inputs or value of data members and the like.

In an aspect, the evaluation tool 210, upon identifying the one or more logical attributes from the master solution, displays the identified logical attributes on the user interface and allows the user to provide scoring information for each attribute to be tested (Block 310). As shown in FIG. 6, the evaluation tool 210 displays, for an example, four identified functionalities (e.g. Class KnowledgeAsset, Class BOK) along with their respective attributes (e.g. Setters and Getters, Constructor Initialization). For each attribute, the evaluation tool 210 displays a field in which the user is able to insert score values (e.g. points, percentages) per attribute to be tested. The evaluation tool 210 thereafter applies the score values to a scoring profile for the problem and stores the same in memory.

Referring back to FIG. 3, the evaluation tool 210 is configured to generate one or more test cases for each attribute it identifies when processing the master software solution (Block 312). The evaluation program, in an aspect, generates at least one static test case for the one or more static attribute(s) identified from the master solution. In particular to an aspect, the generated static test cases may be used by the evaluation tool 210 to evaluate one or more structural requirements in the student's submission for the proposed problem.

In an example, the evaluation tool 210 may determine that the master solution for the proposed problem requires that a series of identification numbers be automatically generated. In processing the master solution, the evaluation tool 210 may identify a syntactical procedure with name generateNextID, which is known as an object that generates a next series of numbers. By identifying this syntactical attribute, the evaluation tool 210 is able to generate one or more test cases that would check the syntax for the generateNextID procedure in the students' responses as well as check the prototype of the procedure in terms of the arguments and the return type.

For dynamic or logical based attributes, the evaluation tool 210 may use the parsing and/or reflection based method along with unit testing methods to check the correctness of the logic in the students' responses.

For example, the proposed problem and master solution may require the students' responses to include a logical based attribute which causes the automatic generation of a series of identification numbers. In processing the master solution, the evaluation tool 210 may identify a procedure with name generateNextID for the generation of the next series of numbers, whereby the generated numbers are in the range of 1 to 5000. Considering that a range component is part of the attribute, it would be considered by the evaluation tool 210 to be a logical based attribute. Accordingly, the evaluation tool 210 will generate a plurality test cases that check the correctness of the logic for this procedure, whereby the test cases include input values (multiple inputs) to check the generation of next series of the ID for the range 1-5000 and check the response from the software code in case a number is input outside of the 1-5000 range.

Once the evaluation tool 210 has generated all of the test cases for each identified attribute, the generated test cases are written in an evaluation program generated by the evaluation tool 210 for the problem project (Block 314). In an aspect, the evaluation program is generated in XML format, although other formats are contemplated. The generated evaluation program, along with the generated test case(s) for each identified attribute, is then stored by the evaluation tool 210 in a memory until it is needed to evaluate one or more student submitted responses to the proposed problem.

Figure 4:
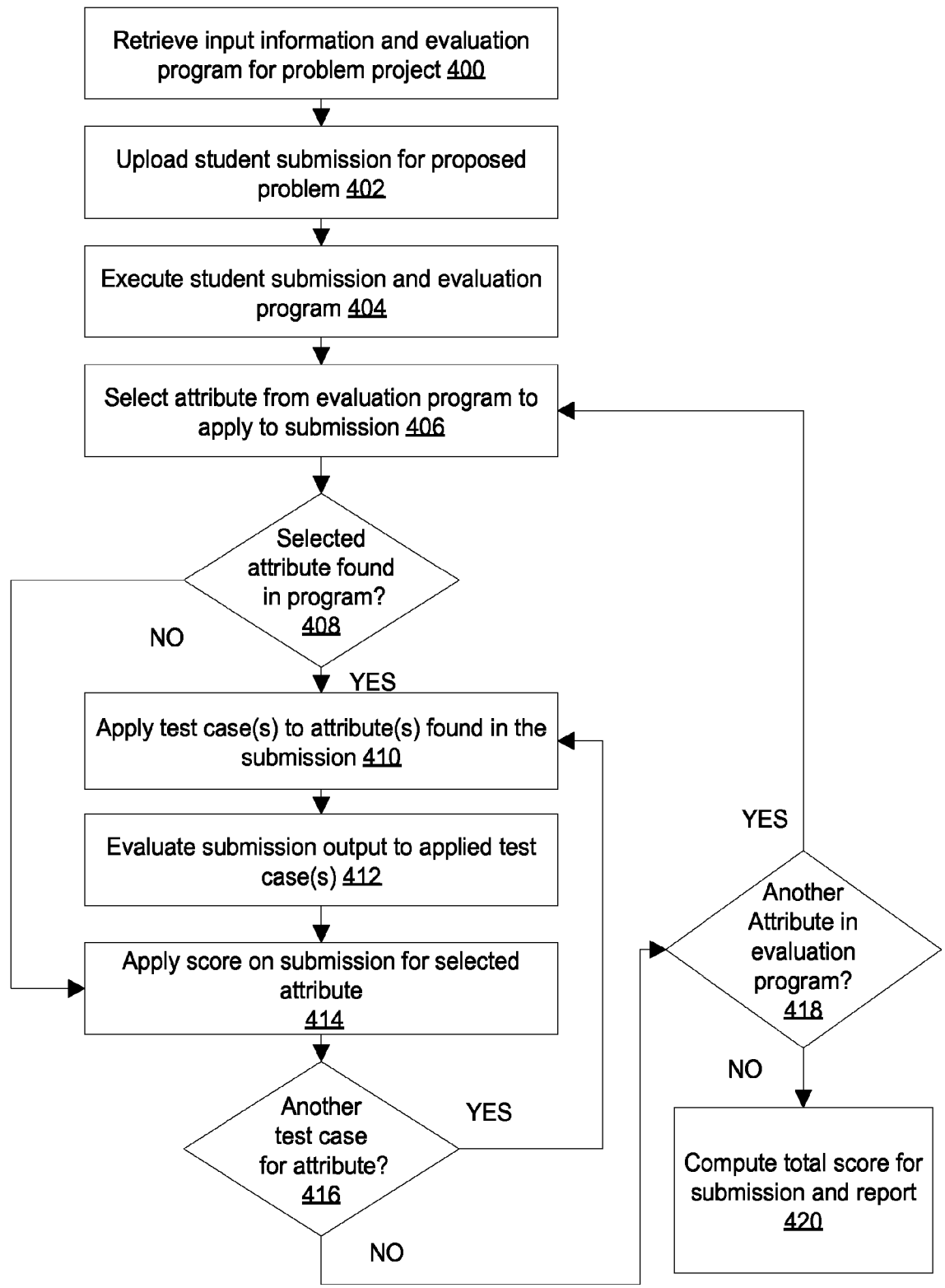
FIG. 4 illustrates an example flow chart diagram depicting at least a portion of processes performed by the evaluation tool in accordance with an aspect of the present disclosure.

FIG. 4 illustrates a flow chart describing the process for applying the generated evaluation program to one or more submitted responses to the proposed problem in accordance with an aspect of the present disclosure. In particular, the evaluation tool 210, via the user interface, allows the user to retrieve the evaluation program/script for a given proposed problem along with the score profile for the proposed problem (Block 400).

The evaluation tool 210 is configured to be used to assess one or more student submissions to the proposed problem. In particular, the evaluation tool 210, via the user interface, allows the user to upload one or more student submissions to the proposed problem for the problem project (Block 402). In an aspect, the evaluation program may be in XML format and would be converted by the evaluation tool 210 into a programming language compatible with the programming language in which the students' submitted program is written. By converting the evaluation program to be compatible with the student submitted program, the evaluation tool 210 is able to perform the evaluation and scoring functions described in more detail below. For programs written in the object oriented domain, methods and classes that form the basis of the object oriented programs can be used to create instances for each of the classes. Accordingly, the evaluation tool 210 is able to apply the evaluation program to the submitted program by inputting test cases which match the attributes in the submitted program.

In an aspect, the evaluation tool 210 is a component that performs only the steps described in FIG. 3, whereby the evaluation tool 210 interfaces and operates with another software tool, provided by a vendor or $3^{rd}$ party, which actually executes the submitted program and applies the information in the evaluation program to the executed submitted program. In another aspect, the evaluation tool 210 is more comprehensive and performs both functions described in FIGS. 3 and 4. In this aspect, not only will the evaluation tool 210 generates the evaluation program, but also be configured to execute the submitted program and the evaluation program whereby the inputs of the evaluation program are applied by the evaluation tool 210 to the executed submitted program. In this aspect, the evaluation tool 210 may be configured to perform scoring functions on the executed submitted program in accordance with the scoring profile.

Referring back to FIG. 4, upon a first student's submission and evaluation program being uploaded for a particular problem project, the evaluation tool 210 (or other software component) executes the uploaded submitted program with the evaluation program for the proposed problem (Block 404). For sake of brevity, the following description refers to the evaluation tool 210 performing evaluation steps on the submitted response, although it should be noted that another software program, provided by a vendor or other party, can be used to perform these functions in which the evaluation tool 210 would thereby interface and operate in conjunction with the other software program.

In executing the submitted program, the evaluation tool 210 utilizes the information contained in the evaluation program to identify the static and logical attributes which are to be tested on the submitted program. Although only exemplary, FIG. 4 shows that the evaluation tool 210 chooses or selects an attribute to apply to the submitted response (Block 406).

In an aspect, the evaluation tool 210 selects an identified attribute from the evaluation program and uses parsing and/or reflection methods on the submitted program to determine whether the program contains that identified attribute (Block 408).

In an example aspect, if the program does not contain the identified attribute, the evaluation tool 210 records, in a score card for that submitted program, that the submitted program did not contain that attribute and records an appropriate score value in accordance with the scoring profile (Block 414).

Referring back to Block 408, if, on the other hand, the evaluation tool 210 identifies a corresponding attribute in the submission program, the evaluation tool 210 retrieves the stored test case inputs from the evaluation program for that selected attribute and applies it to the submitted program as one or more inputs (Block 410).

The evaluation tool 210 evaluates the result output from the submitted response (Block 412). This is done by comparing the results output from the submitted answer with a satisfactory answer for that attribute that is retrieved from the master solution.

Upon evaluating the output from the submitted response for the inputted test case, the evaluation tool 210 calculates a score for that inputted test case and/or attribute in accordance with the scoring profile established by the user for the problem project (Block 414). In particular, the evaluation tool 210 divides the total given score from the scoring profile to each test case that is satisfactorily handled by the submitted response.

The process continues on the submitted response for each generated test case for that selected attribute (Block 416). If the evaluation tool 210 determines that another test case is available in the evaluation program for that attribute, the process proceeds back to Block 410. If the evaluation tool 210 determines that no other test cases are available for that attribute, the evaluation tool 210 then determines if the evaluation program includes another attribute to evaluate in the submitted program (Block 418).

If so, the process proceeds back to Block 406 in which another attribute is selected by the evaluation tool 210. However, if the evaluation program does not contain another untested attribute, the process proceeds to Block 420.

Once the evaluation tool 210 has tested and scored all the identified attributes/test cases, the evaluation tool 210 generates a report indicating an overall score for the submitted response (Block 420). This report may be displayed on the user interface and can be reported out to the student and/or user.

The present system and method has several advantages. One such advantage is that test cases are automatically generated by the evaluation tool. Additionally, the evaluation tool exhaustively generates the test cases to check the correctness of the logic of the proposed problem. This results in the automated and consistent generation of test cases for a proposed problem. Further, the evaluation tool leverages this consistency in logic which can be used to evaluate a large number of student submitted answers to the problem and automatically generate scores for each submitted response in an efficient manner.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method of evaluating a software program, the method comprising:
    receiving, by an evaluation computing device, a proposed problem application, a master solution associated with the proposed problem application, a score value for each of one or more solution attributes associated with the proposed problem application, and a submitted response to the proposed problem application;
    identifying, by the evaluation computing device, the one or more solution attributes in the master solution and corresponding one or more response attributes in the submitted response to the proposed problem application;
    generating, by the evaluation computing device, one or more master test case outputs corresponding to one or more first test cases, and a scoring profile for the proposed problem application based on the received score value for each of the one or more solution attributes, wherein the one or more first test cases are based on the identified one or more solution attributes in the master solution, and comprise one or more static test cases;
    generating, by the evaluation computing device, one or more submitted response test case outputs by applying the generated one or more first test cases to the corresponding one or more response attributes in the submitted response to the proposed problem application;
    comparing, by the evaluation computing device, the one or more submitted response test case outputs with the corresponding one or more master test case outputs; and
    providing, by the evaluation computing device, an assessment of the submitted response to the proposed problem application based on the comparison of the one or more submitted response test case outputs with the corresponding one or more master case outputs, the assessment comprising an overall score based on applying the scoring profile to the one or more submitted response test case outputs.

2. The method of claim 1, further comprising:
    converting, by the evaluation computing device, the one or more first test cases into a language compatible with the submitted response to the proposed problem application.

3. The method of claim 1, further comprising:
    generating, by the evaluation computing device, a cumulative score for each of the one or more response attributes to the submitted response to the proposed problem application in accordance with the scoring profile when the one or more submitted response test case outputs match the corresponding one or more master test case outputs.

4. The method of claim 1, further comprising:
determining, by the evaluation computing device, when at least one of the one or more solution attributes is a logic based attribute.

5. The method of claim 1, further comprising:
determining, by the evaluation computing device, when at least one of the one or more solution attributes is a static based attribute.

6. The method of claim 1, wherein the identifying further comprises performing a parsing technique on the master solution to identify the one or more solution attributes.

7. The method of claim 1, wherein the identifying further comprises performing a reflection technique on the master solution to identify the one or more solution attributes.

8. A non-transitory computer readable medium having stored thereon instructions for evaluating a software program, comprising machine executable code which when executed by at least one processor, causes the processor to perform steps comprising:
receiving a proposed problem application, a master solution associated with the proposed problem application, a score value for each of one or more solution attributes associated with the proposed problem application, and a submitted response to the proposed problem application;
identifying one or more solution attributes in the master solution and corresponding one or more response attributes in the submitted response to the proposed problem application;
generating one or more master test case outputs corresponding to one or more first test cases, and a scoring profile for the proposed problem application based on the received score value for each of the one or more solution attributes, wherein the one or more first test cases are based on the identified one or more solution attributes in the master solution, and comprise one or more static test cases;
generating one or more submitted response test case outputs by applying the generated one or more first test cases to the corresponding one or more response attributes in the submitted response to the proposed problem application;
comparing the one or more submitted response test case outputs with the corresponding one or more master test case outputs; and
providing an assessment of the submitted response to the proposed problem application based on the comparison of the one or more submitted response test case outputs with the corresponding one or more master case outputs, the assessment comprising an overall score based on applying the scoring profile to the one or more submitted response test case outputs.

9. The medium of claim 8, further having stored thereon instructions that when executed by the processor cause the processor to perform steps further comprising:
converting the one or more test cases into a language compatible with a the submitted response to the proposed problem application.

10. The medium of claim 8, further having stored thereon instructions that when executed by the processor, cause the processor to perform steps comprising:
generating a cumulative score for each of the one or more response attributes in the submitted response to the proposed problem application in accordance with the scoring profile when the one or more submitted response test case outputs match the corresponding one or more master test case outputs.

11. The medium of claim 8, further having stored thereon instructions that when executed by the processor cause the processor to perform steps comprising:
determining when at least one of the one or more solution attributes is a logic based attribute.

12. The medium of claim 8, further having stored thereon instructions that when executed by the processor cause the processor to perform steps comprising:
determining when at least one of the one or more solution attributes is a static based attribute.

13. The medium of claim 8, wherein the identifying further comprises performing a parsing technique on the master solution to identify the one or more solution attributes.

14. The medium of claim 8, wherein the identifying further: comprises performing a reflection technique on the master solution to identify the one or more solution attributes.

15. An evaluation computing device comprising:
one or more processors;
a memory, wherein the memory is coupled to one or more processors which are configured to be capable of executing programmed comprising and stored in the memory to:
receive a proposed problem application, a master solution associated with the proposed problem application, a score value for each of one or more solution attributes associated with the proposed problem application, and a submitted response to the proposed problem application;
identify one or more solution attributes in the master solution and corresponding one or more response attributes in the submitted response to the proposed problem application;
generate one or more master test case outputs corresponding to one or more first test cases, and a scoring profile for the proposed problem application based on the received score value for each of the one or more solution attributes, wherein the one or more first test cases are based on the identified one or more solution attributes in the master solution, and comprise one or more static test cases;
generate one or more submitted response test case outputs by applying the generated one or more first test cases to the corresponding one or more response attributes in the submitted response to the proposed problem application;
compare the one or more submitted response test case outputs with the corresponding one or more master test case; and
provide an assessment of the submitted response to the proposed problem application based on the comparison of the one or more submitted response test case outputs with the corresponding one or more master case outputs, the assessment comprising an overall score based on applying the scoring profile to the one or more submitted response test case outputs.

16. The device of claim 15, wherein the processor is further configured to execute programmed instructions stored in the memory further comprising and stored in the memory to:
convert the one or more first test cases into a language compatible with the first submitted response to the proposed problem application.

17. The device of claim 15, wherein the processor is further configured to execute programmed instructions comprising and stored in the memory to:

generate a cumulative score for each of the one or more response attributes to the submitted response to the proposed problem application in accordance with the scoring profile when the one or more submitted response test case outputs match the corresponding one or more master test case outputs.

18. The device of claim 15, wherein the processor is further configured to execute programmed instructions stored in the memory further comprising and stored in the memory to:
   determine when at least one of the one or more solution attributes is a logic based attribute.

19. The device of claim 15, wherein the processor is further configured to execute programmed instructions stored in the memory further comprising and stored in the memory to:
   determine when at least one of the one or more solution attributes is a static based attribute.

20. The device of claim 15, wherein the identifying further comprises performing a parsing technique on the master solution to identify the one or more solution attributes.

21. The device of claim 15, wherein the identifying further comprises performing a reflection technique on the master solution to identify the one or more solution attributes.

22. The method of claim 1, further comprising:
   generating, by the evaluation computing device, a cumulative score for each of the one or more submitted response test case outputs in accordance with the scoring profile.

23. The medium of claim 8, further having stored thereon instructions that when executed by the processor cause the processor to perform steps further comprising:
   generating a cumulative score for each of the one or more submitted response test case outputs in accordance with the scoring profile.

24. The device of claim 15, wherein the processor is further configured to execute programmed instructions stored in the memory further comprising and stored in the memory to:
   generate a cumulative score for each of the one or more submitted response test case outputs in accordance with the scoring profile.

25. The method of claim 5, further comprising:
   generating, by the evaluation computing device, at least one static test case based on the static based attribute; and
   evaluating, by the evaluation computing device, one or more structural requirements of the submitted response to the proposed problem application, based on the at least one static test case.

26. The medium of claim 12, further having stored thereon instructions that when executed by the processor cause the processor to perform steps further comprising:
   generating at least one static test case based on the static based attribute; and
   evaluating one or more structural requirements of the submitted response to the proposed problem application, based on the at least one static test case.

27. The device of claim 19, wherein the processor is further configured to be capable of executing programmed instructions comprising and stored in the memory to:
   generate at least one static test case based on the static based attribute; and
   evaluate one or more structural requirements of the submitted response to the proposed problem application, based on the at least one static test case.

* * * * *